(12) United States Patent
Chen et al.

(10) Patent No.: US 12,253,409 B2
(45) Date of Patent: Mar. 18, 2025

(54) LIGHT SENSING METHOD HAVING SENSING ORDER ADJUSTING MECHANISM

(71) Applicant: ANPEC ELECTRONICS CORPORATION, Hsinchu (TW)

(72) Inventors: Yu-Yu Chen, Yunlin County (TW); Jia-Hua Hong, Hsinchu (TW); Chih-Yuan Chen, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 336 days.

(21) Appl. No.: 17/950,217

(22) Filed: Sep. 22, 2022

(65) Prior Publication Data

US 2024/0035882 A1 Feb. 1, 2024

(30) Foreign Application Priority Data

Jul. 27, 2022 (TW) .................................. 111128051

(51) Int. Cl.
  *G01J 1/16* (2006.01)
  *G01J 1/42* (2006.01)
  G01J 1/08 (2006.01)

(52) U.S. Cl.
  CPC .............. *G01J 1/16* (2013.01); *G01J 1/4204* (2013.01); *G01J 1/08* (2013.01); *G01J 2001/083* (2013.01); *G01J 2001/1668* (2013.01)

(58) Field of Classification Search
  CPC .... G01J 1/16; G01J 1/4204; G01J 1/08; G01J 2001/083; G01J 2001/1668; H05B 47/11; H05B 47/115; H05B 45/10; G01S 17/02; G09G 3/00
  See application file for complete search history.

(56) References Cited

U.S. PATENT DOCUMENTS

| | | | | |
|---|---|---|---|---|
| 2001/0046317 | A1* | 11/2001 | Kamon | G06T 7/521 382/154 |
| 2016/0097841 | A1* | 4/2016 | Otani | G01S 17/10 356/5.03 |
| 2018/0156899 | A1* | 6/2018 | Yamada | H01L 27/14818 |
| 2018/0329063 | A1* | 11/2018 | Takemoto | G01S 7/487 |
| 2019/0146086 | A1* | 5/2019 | Sato | G01S 17/10 250/206.1 |
| 2019/0179017 | A1* | 6/2019 | Nagai | G01S 7/4915 |
| 2019/0331776 | A1* | 10/2019 | Aotake | G01S 7/497 |
| 2020/0011972 | A1* | 1/2020 | Masuda | G01S 17/894 |
| 2021/0185784 | A1* | 6/2021 | Huang | G01S 17/04 |
| 2021/0213883 | A1* | 7/2021 | Lu | B60R 1/0602 |

* cited by examiner

*Primary Examiner* — Sang H Nguyen
(74) *Attorney, Agent, or Firm* — Li & Cai Intellectual Property (USA) Office

(57) ABSTRACT

A light sensing method having a sensing order adjusting mechanism is provided. The method includes steps of: in a previous sensing cycle, sensing a first light signal that is emitted by both of an ambient light source and a light-emitting component and then is reflected by a tested object; in the previous sensing cycle, sensing a second light signal that is emitted by both of the ambient light source and the light-emitting component and then is reflected by the tested object; in the previous sensing cycle, sensing an ambient light signal emitted by only the ambient light source; and in a next sensing cycle, sensing the first light signal, the second light signal and the ambient light signal in an order different from that in the previous sensing cycle.

10 Claims, 10 Drawing Sheets

LIGHT SENSING METHOD HAVING SENSING ORDER ADJUSTING MECHANISM

CROSS-REFERENCE TO RELATED PATENT APPLICATION

This application claims the benefit of priority to Taiwan Patent Application No. 111128051, filed on Jul. 27, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a light sensing manner, and more particularly to a light sensing method having a sensing order adjusting mechanism.

BACKGROUND OF THE DISCLOSURE

Under different environments, a screen of an electronic product is required to have different brightness to accommodate the human eye viewing the screen. Therefore, light sensors such as ambient light sensors and proximity sensors are widely applied to electronic products such as mobile devices. The brightness of the screen of the electronic product is automatically adjusted according to a value sensed by the light sensor, such as to allow the eyes to feel comfortable anywhere during use of the electronic product.

SUMMARY OF THE DISCLOSURE

In response to the above-referenced technical inadequacies, the present disclosure provides a light sensing method having a sensing order adjusting mechanism. The light sensing method includes the following steps: performing a first light sensing operation to sense a first reflected light signal within a first phase time, wherein the first light signal is emitted by both of an ambient light source and a light-emitting component and then is reflected by a tested object to form a first reflected light signal; performing a second light sensing operation to sense a second reflected light signal within a second phase time, wherein the second light signal is emitted by both of the ambient light source and the light-emitting component and then is reflected by the tested object to form a second reflected light signal; turning off the light-emitting component during a third phase time; performing an ambient light sensing operation to sense an ambient light signal emitted by only the ambient light source within the third phase time; performing counting operations on the first reflected light signal, the second reflected light signal and the ambient light signal; and sequentially performing a plurality of sensing cycles each including the first phase time, the second phase time and the third phase time, wherein an order of performing the first light sensing operation, the second light sensing operation and the ambient light sensing operation in a next one of the plurality of sensing cycles is different from that in a previous one of the plurality of sensing cycles.

In certain embodiments, the light sensing method further includes the following step: sensing the first reflected light signal and the second reflected light signal respectively at different positions.

In certain embodiments, the light sensing method further includes the following step: in any one of the plurality of sensing cycles, sequentially performing the first light sensing operation, the second light sensing operation and the ambient light sensing operation.

In certain embodiments, the light sensing method further includes the following step: in the previous one or the next one of the plurality of sensing cycles, sequentially performing the first light sensing operation, the ambient light sensing operation and the second light sensing operation.

In certain embodiments, the light sensing method further includes the following step: in the previous one or the next one of the plurality of sensing cycles, sequentially performing the second light sensing operation, the first light sensing operation and the ambient light sensing operation.

In certain embodiments, the light sensing method further includes the following step: in the previous one or the next one of the plurality of sensing cycles, sequentially performing the second light sensing operation, the ambient light sensing operation and the first light sensing operation.

In certain embodiments, the light sensing method further includes the following step: in the previous one or the next one of the plurality of sensing cycles, sequentially performing the ambient light sensing operation, the first light sensing operation and the second light sensing operation.

In certain embodiments, the light sensing method further includes the following step: in the previous one or the next one of the plurality of sensing cycles, sequentially performing the ambient light sensing operation, the second light sensing operation and the first light sensing operation.

In certain embodiments, the light sensing method further includes the following steps: performing a first ambient light sensing operation to sense a first ambient light signal emitted by only the ambient light source within a first sub-phase time of the third phase time; performing a second ambient light sensing operation to sense a second ambient light signal emitted by only the ambient light source within a second sub-phase time of the third phase time; and performing the counting operations on the first reflected light signal, the second reflected light signal, the first ambient light signal and the second ambient light signal.

In certain embodiments, the light sensing method further includes the following step: in each of the plurality of sensing cycles, performing the first light sensing operation, the second light sensing operation, the first ambient light sensing operation and the second ambient light sensing operation once. An order of performing the first light sensing operation, the second light sensing operation, the first ambient light sensing operation and the second ambient light sensing operation in the next one of the plurality of sensing cycles is different from that in the previous one of the plurality of sensing cycles.

As described above, the present disclosure provides the light sensing method having the sensing order adjusting mechanism. In the light sensing method of the present disclosure, the light signals are sensed in different orders respectively in different ones of the plurality of sensing cycles. As a result, even if the ambient light source and the tested object dynamically change over time, the light sensing method of the present disclosure can still accurately sense the relevant values.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
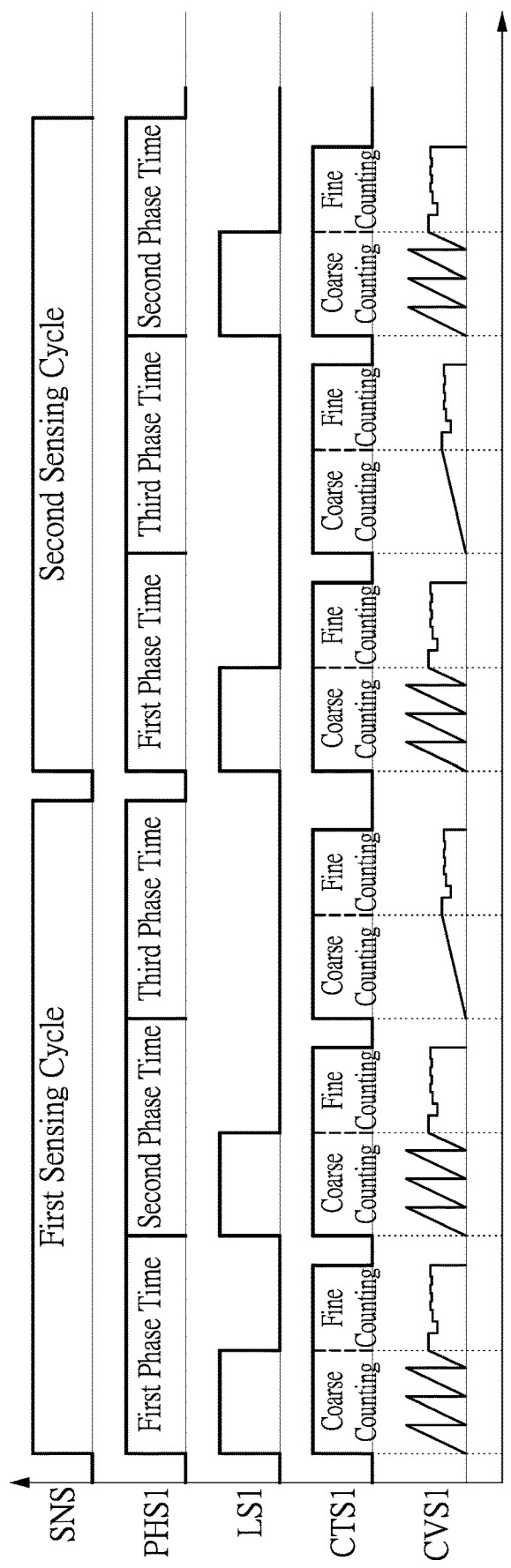
FIG. 1 is a waveform diagram of signals generated when light sensing operations are performed in a light sensing method having a sensing order adjusting mechanism according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 8:
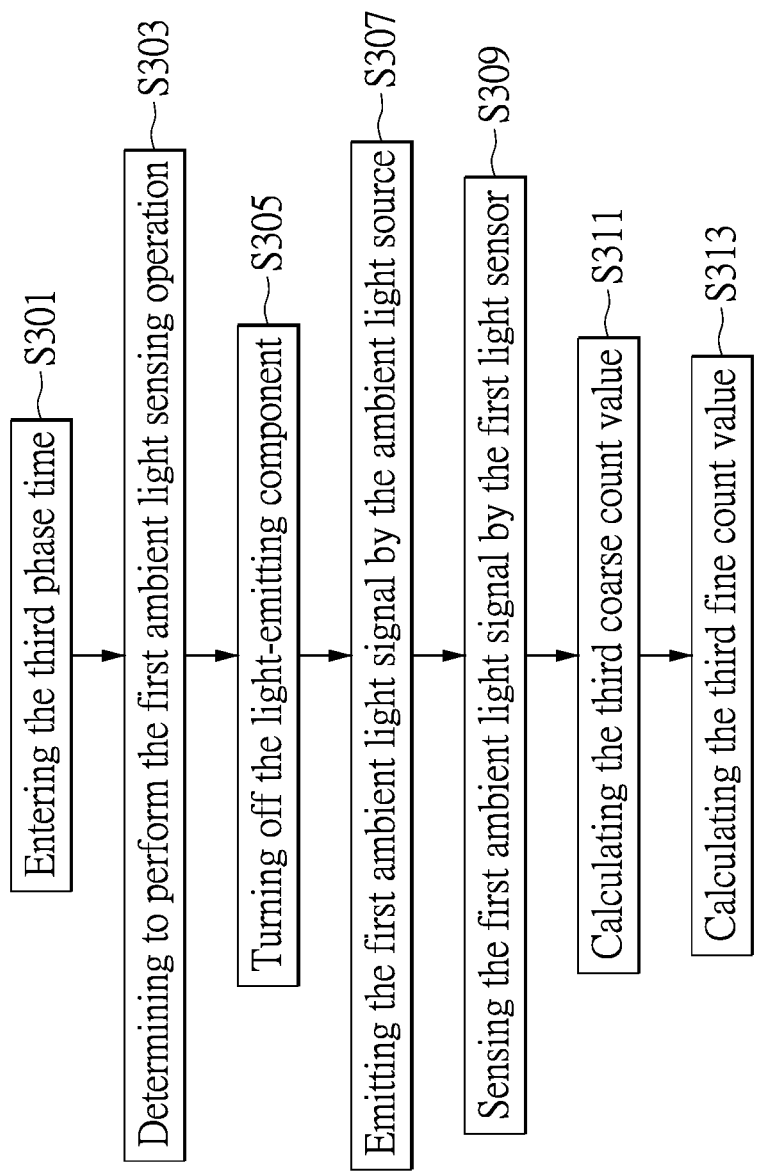
FIG. 8 is a flowchart diagram of performing a first ambient light sensing operation within a third phase time in the light sensing method having the sensing order adjusting mechanism according to the first to fifth embodiments of the present disclosure.
Figure 9:
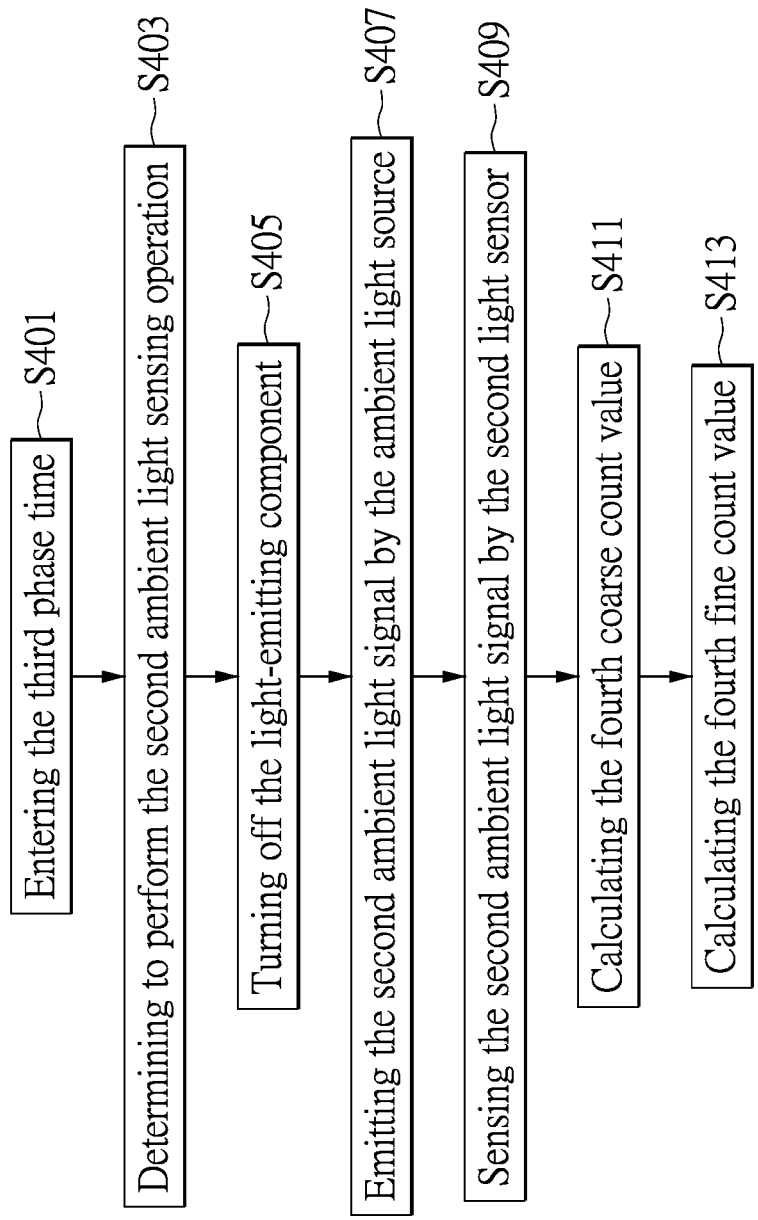
FIG. 9 is a flowchart diagram of performing a second ambient light sensing operation within the third phase time in the light sensing method having the sensing order adjusting mechanism according to the first to fifth embodiments of the present disclosure.
Figure 10:
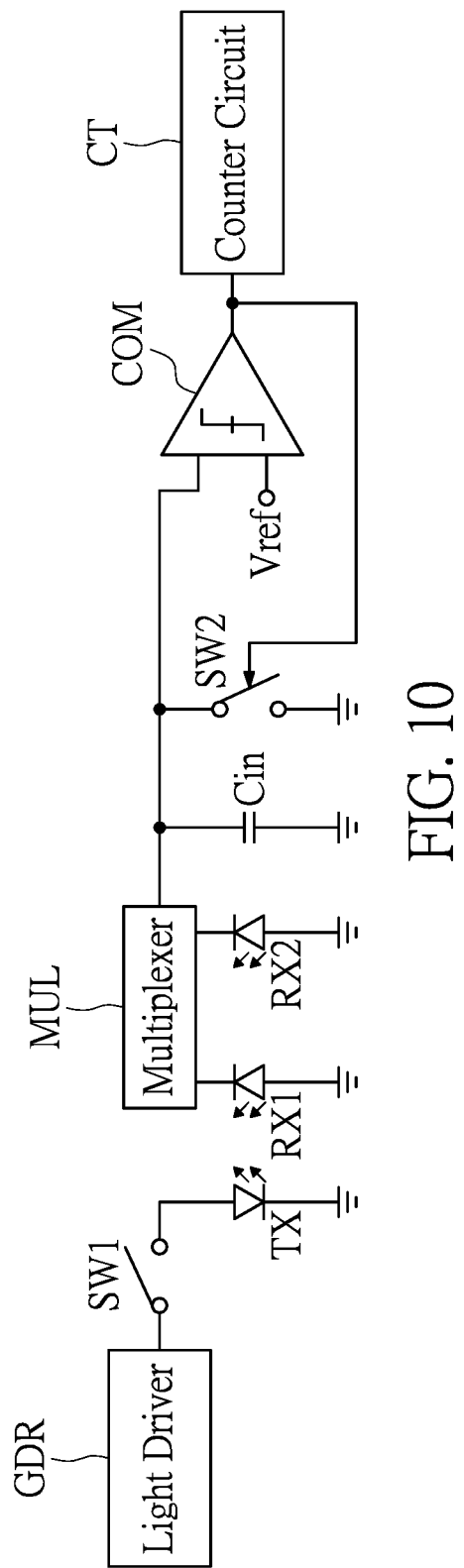
FIG. 10 is a circuit diagram of a light sensing circuit having the sensing order adjusting mechanism according to the first to fifth embodiments of the present disclosure.

Reference is made to FIGS. 1 to 10, in which FIGS. 1 to 5 are waveform diagrams of signals generated when light sensing operations are performed in a light sensing method having a sensing order adjusting mechanism according to a first embodiment of the present disclosure, FIGS. 6 to 9 are flowchart diagrams of the light sensing method having the sensing order adjusting mechanism according to the first to fifth embodiments of the present disclosure, and FIG. 10 is a circuit diagram of a light sensing circuit having the sensing order adjusting mechanism according to the first to fifth embodiments of the present disclosure.

Figure 6:
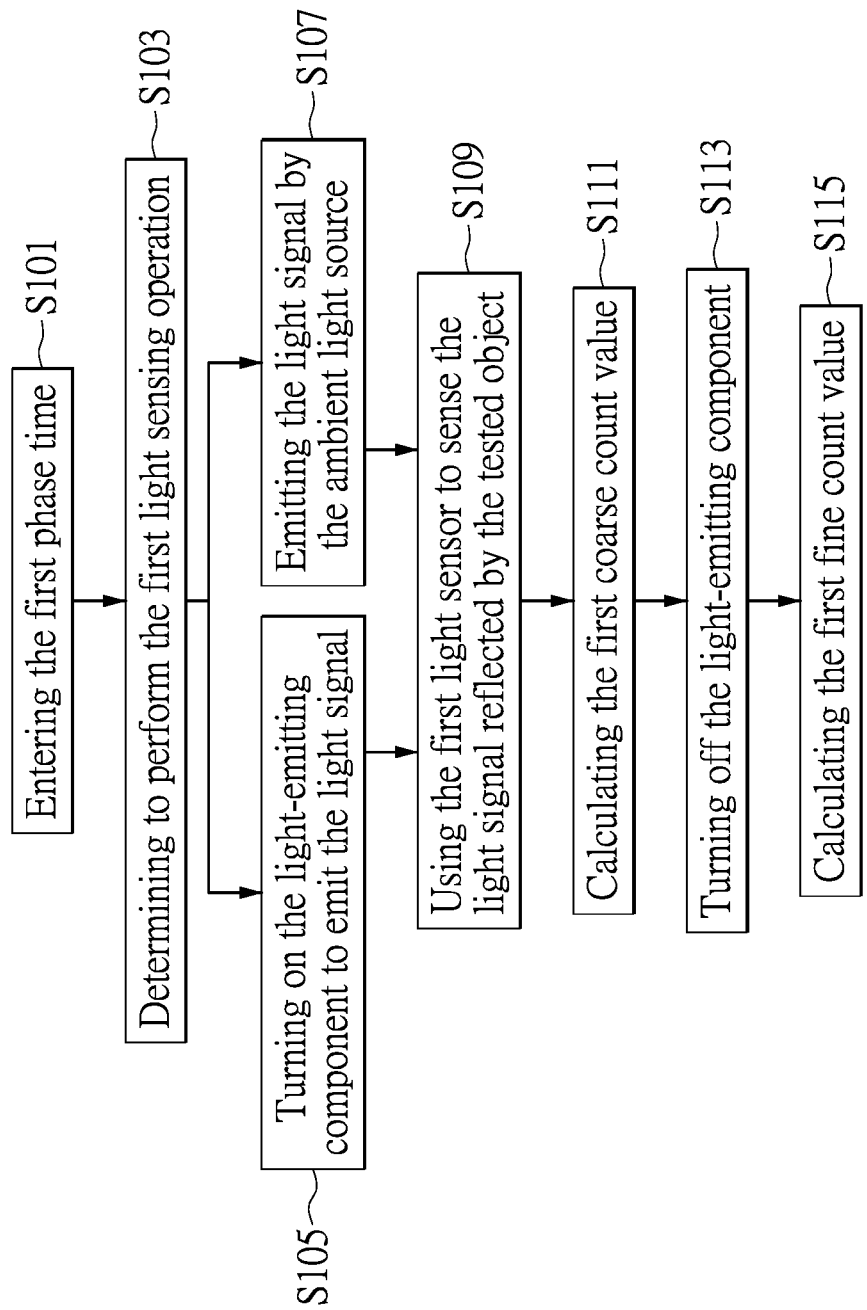
FIG. 6 is a flowchart diagram of performing a first light sensing operation within a first phase time in the light sensing method having the sensing order adjusting mechanism according to the first to fifth embodiments of the present disclosure.
Figure 7:
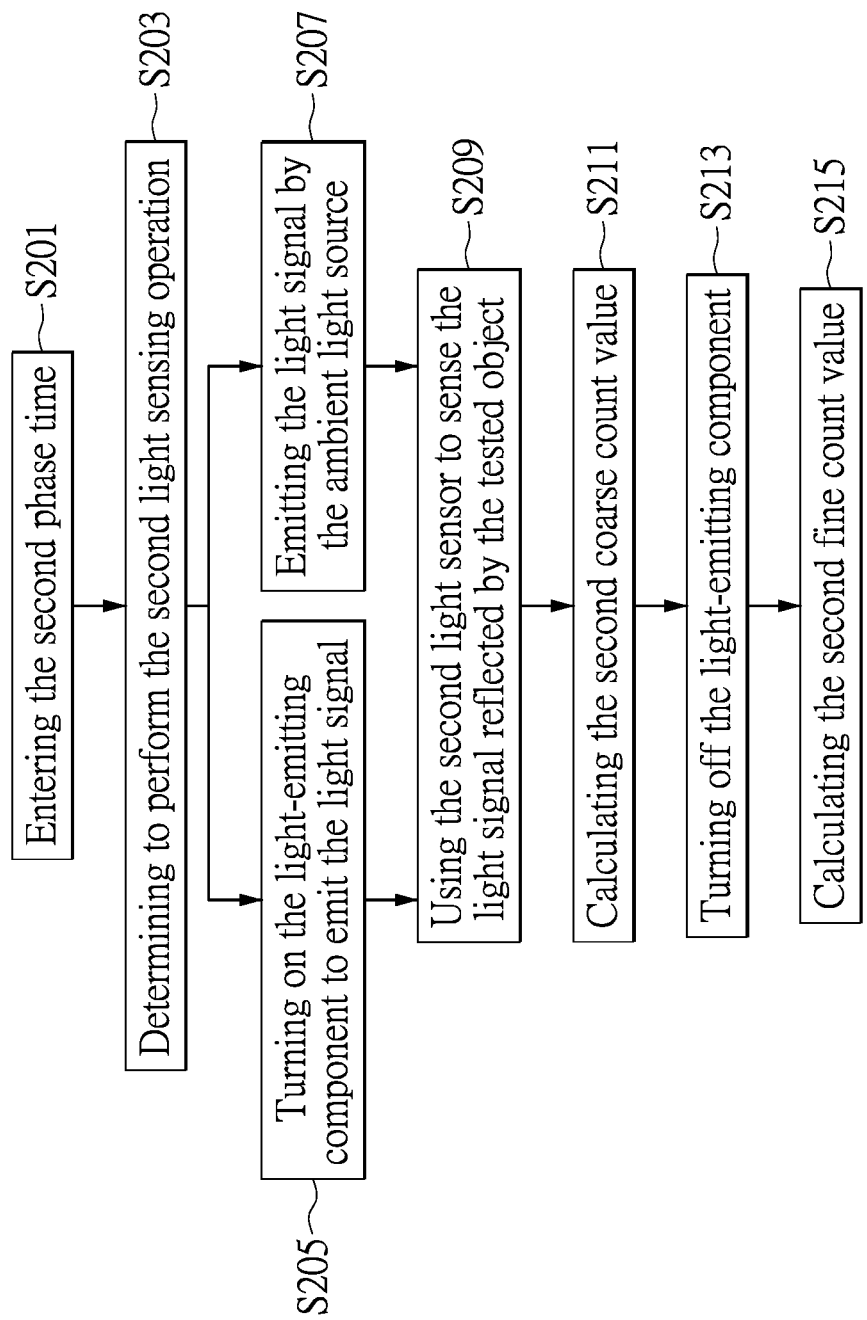
FIG. 7 is a flowchart diagram of performing a second light sensing operation within a second phase time in the light sensing method having the sensing order adjusting mechanism according to the first to fifth embodiments of the present disclosure.

The light sensing method of the present disclosure may include steps S101 to S115 as shown in FIG. 6, steps S201 to S215 as shown in FIG. 7, steps S301 to S313 as shown in FIG. 8 and steps S401 to S413 as shown in FIG. 9, but the present disclosure is not limited thereto. In practice, the light sensing method of the present disclosure may include more light sensing operations according to actual requirements. The light sensing method of the present disclosure may be applied to the light sensing circuit as shown FIG. 10, but the present disclosure is not limited thereto. The light sensing circuit may be disposed in an electronic device (such as, but not limited to a mobile device), and may be used to sense a distance between a tested object (such as user) and the electronic device.

In the light sensing method of the present disclosure, a plurality of sensing cycles such as, but not limited to, a first sensing cycle and a second sensing cycle of a sensing cycle signal SNS as shown in FIGS. 1 to 5 are performed. In each of the plurality of sensing cycles of the light sensing method of the present disclosure, different light sensing operations are performed within different phase times such as a first phase time, a second phase time and a third phase time of phase time signals PHS1 to PHS5 as shown in FIGS. 1 to 5.

When a first light signal is emitted by both of an ambient light source and a light-emitting component and then is reflected by the tested object to form a first reflected light signal, a first light sensing operation of steps S101 to S115 as shown in FIG. 6 is performed. In the first light sensing operation, the first reflected light signal is sensed within the first phase time.

When a second light signal is emitted by both of the ambient light source and the light-emitting component and then is reflected by the tested object to form a second reflected light signal, a second light sensing operation of steps S201 to S215 as shown in FIG. 7 is performed. In the second light sensing operation, the second reflected light signal is sensed within the second phase time.

In a first ambient light sensing operation of steps S301 to S313 as shown in FIG. 8, a first ambient light signal emitted by only the ambient light source is sensed within a first sub-phase time of the third phase time.

In a second ambient light sensing operation of steps S401 to S413 as shown in FIG. 9, a second ambient light signal emitted by only the ambient light source is sensed within a second sub-phase time of the third phase time.

It is worth noting that, in the light sensing method of the present disclosure, an order of performing the first light sensing operation, the second light sensing operation, the first ambient light sensing operation and the second ambient light sensing operation in a next one of the plurality of sensing cycles is different from that in a previous one of the plurality of sensing cycles.

For example, in a first one of the plurality of sensing cycles of the sensing cycle signal SNS as shown in FIGS. 1 to 5, the first light sensing operation of steps S101 to S115, the second light sensing operation of steps S201 to S215, the first ambient light sensing operation of steps S301 to S313 and the second ambient light sensing operation of steps S401 to S413 are sequentially performed, which is described in detail in the following.

In step S101, a current time reaches the first phase time.

In step S103, the light sensing circuit determines that the first light sensing operation is to be performed.

In step S105, a light driver GDR outputs a light driving signal to a light-emitting diode TX (through a first switch component SW1 being turned on) to drive the light-emitting diode TX to emit a first light signal. At the same time, in step S107, the ambient light source emits the first ambient light signal. The light-emitting diode TX described herein may be replaced with other light-emitting components.

The light-emitting diode TX is turned on to emit the first light signal, which is represented by light-emitting component signals LS1 to LS5 at a high level, within the first phase time of phase time signals PHS1 to PHS5, as shown in FIGS. 1 to 5.

When the first light signal is emitted by both of the ambient light source and the light-emitting component and then is reflected to a first light sensor by the tested object (such as the user of the electronic device) to form a first reflected light signal, step S109 is performed. In step S109, the first light sensor (such as a first photoelectric component RX1 as shown in FIG. 10) senses the first reflected light signal.

If necessary, the first photoelectric component RX1 of the light sensing circuit as shown in FIG. 10 may convert light energy of the first reflected light signal into a first photocurrent. Then, the first photoelectric component RX1 provides the first photocurrent to a capacitor Cin to charge the capacitor Cin to a first voltage. The first voltage of the capacitor Cin may be a voltage of a waveform of one of capacitor voltage signals CVS1 to CYS5 within the first phase time as shown in FIGS. 1 to 5.

A first input terminal of a comparator COM may receive the voltage of the capacitor Cin. A second input terminal of the comparator COM may receive a reference voltage Vref. When the capacitor Cin is charged to the first voltage, the comparator COM may compare the first voltage of the capacitor Cin with the reference voltage Vref to output a first comparison signal.

In step S111, a counter circuit CT counts a first coarse count value according to the first reflected light signal or a level of the first comparison signal converted from the first reflected light signal. For example, each time the first comparison signal reaches a high level, the counter circuit CT counts the first coarse count value once. When the counter circuit CT receives the first comparison signal and counts the first coarse count value according to the first comparison signal, a second switch component SW2 shown in FIG. 10 may be turned on according to a (high) level of the first comparison signal. As a result, the voltage of the first input terminal of the comparator COM is reset through the second switch component SW2 being turned on.

In step S113, the light driver GDR turns off the light-emitting component and stops driving the light-emitting component to emit the first light signal. As shown in FIGS. 1 to 5, after the first coarse count value is counted in the course counting operation of counting signals CTS1 to CTS5 within the first phase time of the phase time signals PHS1 to PHS5, the light-emitting component signals LS1 to LS5 transit from the high level to a low level. This means that the light-emitting component is turned off or stops emitting the light signal.

In step S115, the counter circuit CT performs a fine counting operation of the counting signals CTS1 to CTS5 on the first coarse count value (that is converted by an analog-digital converter) to count a first fine count value within the first phase time of the phase time signals PHS1 to PHS5.

It should be understood that, the ambient light source may change over time, or the tested object may move dynamically over time so that the distance between the tested object and the light sensing circuit continually changes. When the tested object is too close to the light sensing circuit, light energy reflected to the light sensing circuit by the tested object may be too small. Under this condition, the light sensing circuit may not correctly calculate the distance between the tested object and the light sensing circuit according to the reflected light energy. Therefore, in the light sensing method of the embodiment of the present disclosure, the first light signal and the second light signal are respectively sensed at different positions.

The light sensing circuit of the embodiment of the present disclosure may not only include the first light sensor (such as the first photoelectric component RX1), but also include a second light sensor (such as a second photoelectric component RX2 as shown in FIG. 10). In steps S101 to S115, the first light sensor is configured to sense the first light signal as described above. In steps S201 to S215, the second light sensor is configured to sense the second light signal as described in the following.

As shown in FIG. 10, the light sensing circuit of the embodiment of the present disclosure may further include a multiplexer MUL. The multiplexer MUL is configured to select one of the first photocurrent and the second photocurrent. When the current time reaches the first phase time of the phase time signals PHS1 to PHS5 as shown in FIGS. 1 to 5, the multiplexer MUL selects the first photocurrent outputted by the first photoelectric component RX1, and transmits the first photocurrent to the capacitor Cin to charge the capacitor Cin. When the current time reaches the second phase time of the phase time signals PHS1 to PHS5 as shown in FIGS. 1 to 5, the multiplexer MUL selects the second photocurrent outputted by the second photoelectric component RX2, and transmits the second photocurrent to the capacitor Cin to charge the capacitor Cin.

In step S201, the current time reaches the second phase time.

In step S203, the light sensing circuit determines that the second light sensing operation is to be performed.

In step S205, the light driver GDR outputs the light driving signal to the light-emitting diode TX (through the first switch component SW1 being turned on) to drive the light-emitting diode TX to emit the second light signal. At the same time, in step S207, the ambient light source emits the second ambient light signal. The light-emitting diode TX may be replaced with other light-emitting components.

The light-emitting diode TX is turned on to emit the second light signal, which is represented by the light-emitting component signals LS1 to LS5 at a high level, within the second phase time of the phase time signals PHS1 to PHS5, as shown in FIGS. 1 to 5.

In step S209, the light-emitting component emits the second light signal and the ambient light source emits the second ambient light signal at the same time. Then, the second light signal and the second ambient light signal are reflected by the tested object (such as the user of the electronic device) to form the second reflected light signal. At this time, the second light sensor (such as the second photoelectric component RX2 as shown in FIG. 10) senses the second reflected light signal.

If necessary, the second photoelectric component RX2 may convert light energy of the second reflected light signal into the second photocurrent and provide the second photocurrent to the capacitor Cin. The capacitor Cin is charged, by the second photocurrent, to a second voltage such as a voltage of a waveform of one of the capacitor voltage signals CVS1 to CYS5, within the second phase time of the phase time signals PHS1 to PHS5 as shown in FIGS. 1 to 5. The comparator COM may compare the second voltage of the capacitor Cin with the reference voltage Vref to output a second comparison signal.

In step S211, the counter circuit CT counts a second coarse count value according to the second reflected light signal or a level of the second comparison signal converted from the second reflected light signal.

In step S213, the light driver GDR turns off the light-emitting component and stops driving the light-emitting component to emit the second light signal. As shown in FIGS. 1 to 5, after the second coarse count value is counted in the course counting operation of the counting signals CTS1 to CTS5 within the second phase time of the phase time signals PHS1 to PHS5, the light-emitting component signals LS1 to LS5 transit from the high level to a low level. This means that the light-emitting component is turned off or stops emitting the light signal.

In step S215, the counter circuit CT performs a fine counting operation of each of the counting signals CTS1 to CTS5 on the second coarse count value (that is converted by the analog-digital converter) to count a second fine count value within the second phase time of the phase time signals PHS1 to PHS5 as shown in FIGS. 1 to 5.

As described above, the light signal sensed by the light sensing circuit includes the light signal emitted by the light-emitting component such as the light-emitting diode TX, and the ambient light signal emitted by only the ambient light source. Therefore, steps S301 to S313 and steps S401 to S413 are performed as described in the following. In steps S301 to S313 and steps S401 to S413, the light-emitting component is turned off and the light sensing circuit only senses the ambient light signal emitted by only the ambient light source. It should be understood that, the ambient light source may always emits the same ambient light signal (having same light intensity at a same light emission angle) over time. Under this condition, only steps S301 to S313 but not steps S401 to S413 need to be performed, or only steps S401 to S413 but not steps S301 to S313 need to be performed. That is, the ambient light signal only needs to be sensed once.

In step S301, the current time reaches the third phase time.

In step S303, the light sensing circuit determines that the first ambient light sensing operation is to be performed.

In step S305, the light-emitting component is continually turned off. The light-emitting component is turned off or does not emit any light signal, which is represented by the light-emitting component signals LS1 to LS5 at a low level, within the third phase time of the phase time signals PHS1 to PHS5, as shown in FIGS. 1 to 5.

In step S307, the ambient light source emits the first ambient light signal.

In step S309, the first light sensor (such as the first photoelectric component RX1 as shown in FIG. 10) senses the first ambient light signal.

If necessary, the first photoelectric component RX1 may convert light energy of the first ambient light signal into a first ambient photocurrent. Then, the first photoelectric component RX1 may provide the first ambient photocurrent to the capacitor Cin to charge the capacitor Cin to a third voltage. The third voltage of the capacitor Cin may be a voltage of a waveform of one of the capacitor voltage signals CVS1 to CYS5 within the third phase time of the phase time signals PHS1 to PHS5 as shown in FIGS. 1 to 5.

The first input terminal of the comparator COM may receive the third voltage of the capacitor Cin. The second input terminal of the comparator COM may receive the reference voltage Vref. The comparator COM may compare the third voltage of the capacitor Cin with the reference voltage Vref to output a third comparison signal.

In step S311, the counter circuit CT counts a third coarse count value according to the first ambient light signal or a level of the third comparison signal converted from the first ambient light signal.

In step S313, the counter circuit CT performs a fine counting operation of each of the counting signals CTS1 to CTS5 on the third coarse count value (that is converted by the analog-digital converter) to count a third fine count value, within the third phase time of the phase time signals PHS1 to PHS5, as shown in FIGS. 1 to 5.

In step S401, the current time reaches the third phase time.

In step S403, the light sensing circuit determines that the second ambient light sensing operation is to be performed.

In step S405, the light-emitting component is continually turned off.

In step S407, the ambient light source emits the second ambient light signal.

In step S409, the first light sensor (such as the first photoelectric component RX1 as shown in FIG. 10) senses the second ambient light signal.

If necessary, the second photoelectric component RX1 may convert light energy of the second ambient light signal into a second ambient photocurrent. Then, the second photoelectric component RX1 may provide the second ambient photocurrent to the capacitor Cin to charge the capacitor Cin to a fourth voltage. The fourth voltage of the capacitor Cin may be a voltage of a waveform of one of capacitor voltage signals CVS1 to CYS5 within the third phase time of the phase time signals PHS1 to PHS5 as shown in FIGS. 1 to 5.

The comparator COM may compare the fourth voltage of the capacitor Cin with the reference voltage Vref to output a fourth comparison signal.

In step S411, the counter circuit CT counts a fourth coarse count value according to the second ambient light signal or a level of the fourth comparison signal converted from the second ambient light signal.

In step S413, the counter circuit CT performs a fine counting operation of each of the counting signals CTS1 to CTS5 on the fourth coarse count value (that is converted by the analog-digital converter) to count a fourth fine count value, within the third phase time of the phase time signals PHS1 to PHS5, as shown in FIGS. 1 to 5.

In the light sensing method of the present disclosure, the plurality of sensing cycles are sequentially performed. An order of performing the first light sensing operation, the second light sensing operation, the first ambient light sensing operation and the second ambient light sensing operation in a next one (such as a first one) of the plurality of sensing cycles is different from that in a previous one (such as a second one) of the plurality of sensing cycles. For the convenience of description, the first to fifth embodiments are exemplified in the following, but the present disclosure is not limited thereto.

Reference is made to FIG. 1, which is a waveform diagram of signals generated when light sensing operations are performed in a light sensing method having a sensing order adjusting mechanism according to the first embodiment of the present disclosure.

In the light sensing method of the present disclosure, the plurality of sensing cycles including the first sensing cycle and the second sensing cycle of the sensing cycle signal SNS as shown in FIG. 1 are performed.

As shown in FIG. 1, in a first one of the plurality of sensing cycles of the sensing cycle signal SNS, the current time sequentially reaches the first phase time, the second phase time and the third phase time of the phase time signal PHS1. Then, in a second one of the plurality of sensing cycles (that is next to the first one of the plurality of sensing cycles) of the sensing cycle signal SNS, the current time sequentially reaches the first phase time, the third phase time and the second phase time.

In detail, in the embodiment, in the first one of the plurality of sensing cycles, the first light sensing operation is performed within the first phase time of the phase time signal PHS1, then the second light sensing operation is performed within the second phase time of the phase time signal PHS1, and then the ambient light sensing operation (including the first ambient light sensing operation and the second ambient light sensing operation) is performed within the third phase time of the phase time signal PHS1.

It is worth noting that, in the embodiment, in the second one of the plurality of sensing cycles (that is next to the first one of the plurality of sensing cycles) of the sensing cycle signal SNS, the first light sensing operation is performed within the first phase time of the phase time signal PHS1, then the ambient light sensing operation (including the first ambient light sensing operation and the second ambient light sensing operation) is performed within the third phase time of the phase time signal PHS1, and then the second light sensing operation is performed within the second phase time of the phase time signal PHS1.

It is apparent that, in the light sensing method of the present disclosure, the order of performing the first light sensing operation, the second light sensing operation and the ambient light sensing operation in the next one of the plurality of sensing cycles is different from that in the previous one of the plurality of sensing cycles.

Figure 2:
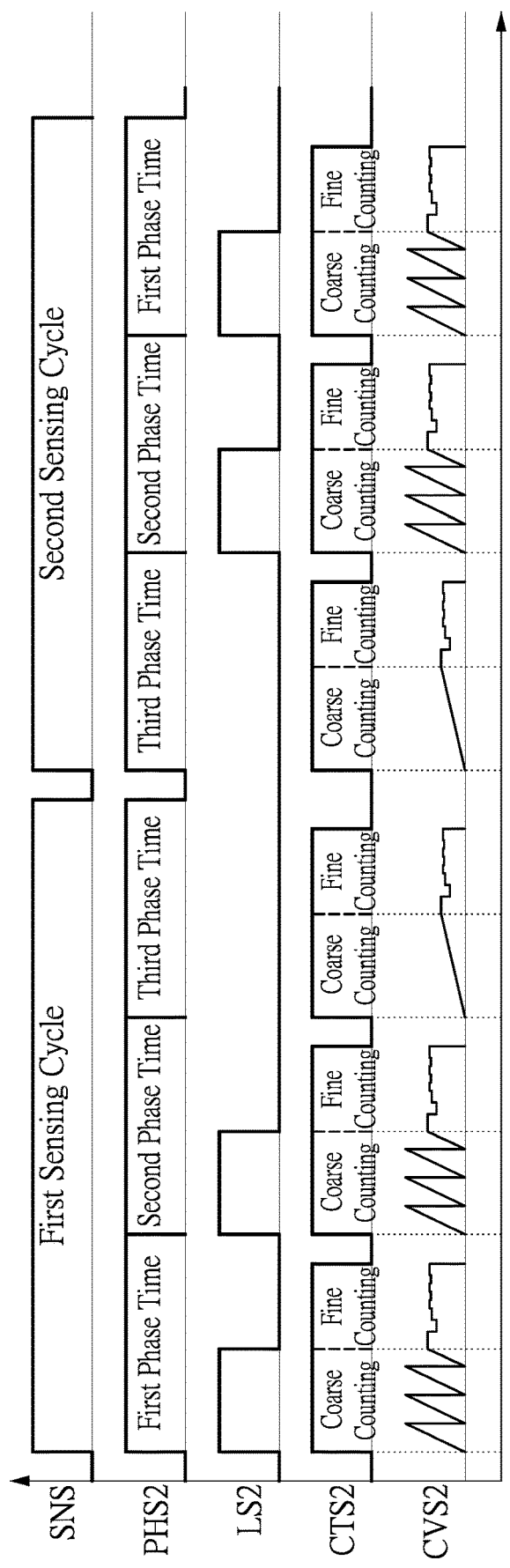
FIG. 2 is a waveform diagram of signals generated when light sensing operations are performed in a light sensing method having a sensing order adjusting mechanism according to a second embodiment of the present disclosure.

Reference is made to FIG. 2, which is a waveform diagram of signals generated when light sensing operations are performed in a light sensing method having a sensing order adjusting mechanism according to the second embodiment of the present disclosure.

As shown in FIG. 2, in a first one of the plurality of sensing cycles of the sensing cycle signal SNS, the current time sequentially reaches the first phase time, the second phase time and the third phase time of the phase time signal PHS2. Then, in a second one of the plurality of sensing cycles (that is next to the first one of the plurality of sensing cycles) of the sensing cycle signal SNS, the current time sequentially reaches the third phase time, the second phase time and the first phase time.

In detail, in the embodiment, in the first one of the plurality of sensing cycles, the first light sensing operation is performed within the first phase time of the phase time signal PHS2, then the second light sensing operation is performed within the second phase time of the phase time signal PHS2, and then the ambient light sensing operation (including the first ambient light sensing operation and the second ambient light sensing operation) is performed within the third phase time of the phase time signal PHS2.

It is worth noting that, in the second one of the plurality of sensing cycles (that is next to the first one of the plurality of sensing cycles) of the sensing cycle signal SNS in the present embodiment, the ambient light sensing operation is performed within the third phase time of the phase time signal PHS2, then the second light sensing operation is performed within the second phase time of the phase time signal PHS2, and then the first light sensing operation is performed within the first phase time of the phase time signal PHS2.

It is apparent that, in the light sensing method of the present disclosure, the order of performing the first light sensing operation, the second light sensing operation and the ambient light sensing operation in the next one of the plurality of sensing cycles is different from that in the previous one of the plurality of sensing cycles.

Figure 3:
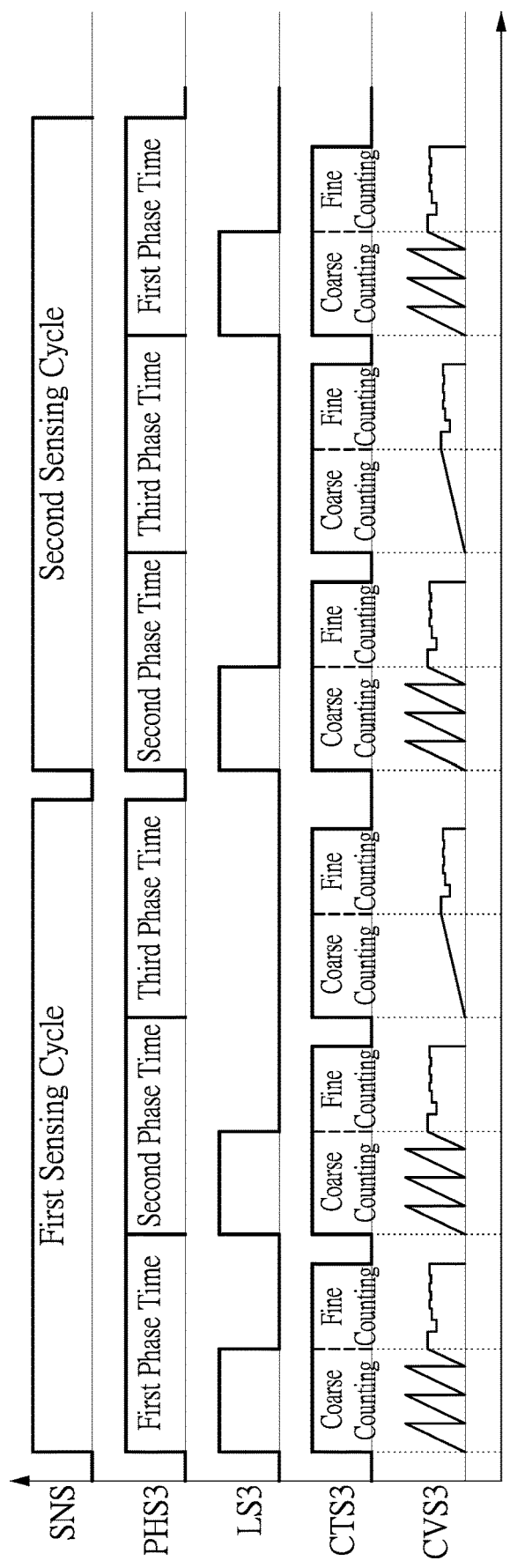
FIG. 3 is a waveform diagram of signals generated when light sensing operations are performed in a light sensing method having a sensing order adjusting mechanism according to a third embodiment of the present disclosure.

Reference is made to FIG. 3, which is a waveform diagram of signals generated when light sensing operations are performed in a light sensing method having a sensing order adjusting mechanism according to the third embodiment of the present disclosure.

As shown in FIG. 3, in a first one of the plurality of sensing cycles of the sensing cycle signal SNS, the current time sequentially reaches the first phase time, the second phase time and the third phase time of the phase time signal PHS3. Then, in a second one of the plurality of sensing cycles (that is next to the first one of the plurality of sensing cycles) of the sensing cycle signal SNS, the current time sequentially reaches the second phase time, the third phase time and the first phase time.

In detail, in the first one of the plurality of sensing cycles in the present embodiment, the first light sensing operation is performed within the first phase time of the phase time signal PHS3, then the second light sensing operation is performed within the second phase time of the phase time signal PHS3, and then the ambient light sensing operation (including the first ambient light sensing operation and the second ambient light sensing operation) is performed within the third phase time of the phase time signal PHS3.

It is worth noting that, in the second one of the plurality of sensing cycles (that is next to the first one of the plurality of sensing cycles) of the sensing cycle signal SNS as shown in FIG. 3, the second light sensing operation is performed within the second phase time of the phase time signal PHS3, then the ambient light sensing operation is performed within the third phase time of the phase time signal PHS3, and then the first light sensing operation is performed within the first phase time of the phase time signal PHS3.

It is apparent that, in the light sensing method of the present disclosure, the order of performing the first light sensing operation, the second light sensing operation and the ambient light sensing operation in the next one of the plurality of sensing cycles is different from that in the previous one of the plurality of sensing cycles.

Figure 4:
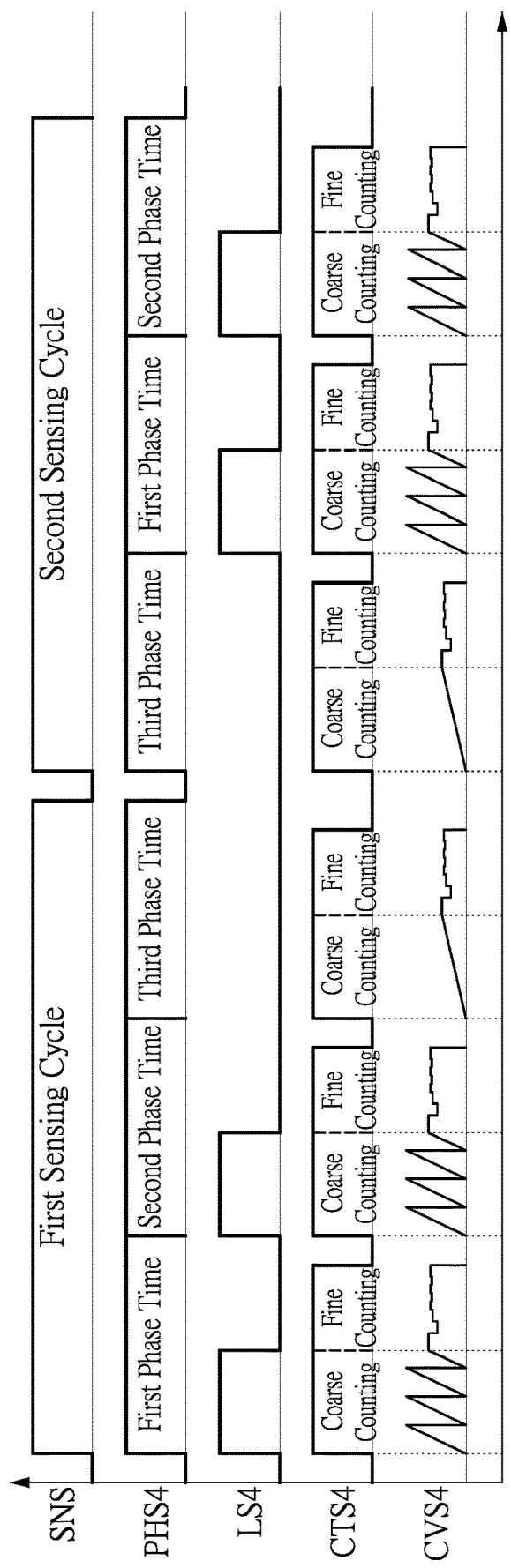
FIG. 4 is a waveform diagram of signals generated when light sensing operations are performed in a light sensing method having a sensing order adjusting mechanism according to a fourth embodiment of the present disclosure.

Reference is made to FIG. 4, which is a waveform diagram of signals generated when light sensing operations are performed in a light sensing method having a sensing order adjusting mechanism according to the fourth embodiment of the present disclosure.

As shown in FIG. 4, in a first one of the plurality of sensing cycles of the sensing cycle signal SNS, the current time sequentially reaches the first phase time, the second phase time and the third phase time of the phase time signal PHS4. Then, in a second one of the plurality of sensing cycles (that is next to the first one of the plurality of sensing cycles) of the sensing cycle signal SNS, the current time sequentially reaches the third phase time, the first phase time and the second phase time.

In detail, in the first one of the plurality of sensing cycles in the embodiment, the first light sensing operation is performed within the first phase time of the phase time signal PHS4, then the second light sensing operation is performed within the second phase time of the phase time signal PHS4, and then the ambient light sensing operation (including the first ambient light sensing operation and the second ambient light sensing operation) is performed within the third phase time of the phase time signal PHS4.

It is worth noting that, in the embodiment, in the second one of the plurality of sensing cycles (that is next to the first one of the plurality of sensing cycles) of the sensing cycle signal SNS as shown in FIG. 4, the ambient light sensing operation is performed within the third phase time of the phase time signal PHS4, then the first light sensing operation is performed within the first phase time of the phase time signal PHS4, and then the second light sensing operation is performed within the second phase time of the phase time signal PHS4.

It is apparent that, in the light sensing method of the present disclosure, the order of performing the first light sensing operation, the second light sensing operation and the ambient light sensing operation in the next one of the plurality of sensing cycles is different from that in the previous one of the plurality of sensing cycles.

Figure 5:
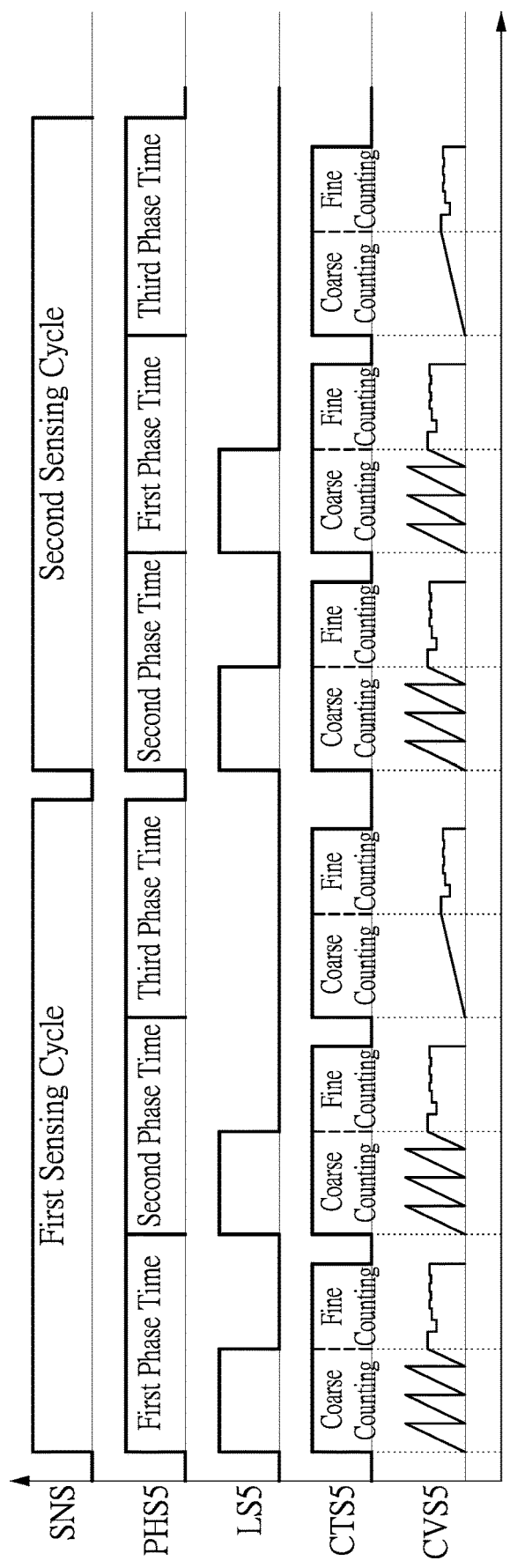
FIG. 5 is a waveform diagram of signals generated when light sensing operations are performed in a light sensing method having a sensing order adjusting mechanism according to a fifth embodiment of the present disclosure.

Reference is made to FIG. 5, which is a waveform diagram of signals generated when light sensing operations are performed in a light sensing method having a sensing order adjusting mechanism according to the fifth embodiment of the present disclosure.

As shown in FIG. 5, in a first one of the plurality of sensing cycles of the sensing cycle signal SNS, the current time sequentially reaches the first phase time, the second phase time and the third phase time of the phase time signal PHS5. Then, in a second one of the plurality of sensing cycles (that is next to the first one of the plurality of sensing cycles) of the sensing cycle signal SNS, the current time sequentially reaches the second phase time, the first phase time and the third phase time.

In detail, in the embodiment, in the first one of the plurality of sensing cycles, the first light sensing operation is performed within the first phase time of the phase time signal PHS5, then the second light sensing operation is performed within the second phase time of the phase time signal PHS5, and then the ambient light sensing operation (including the first ambient light sensing operation and the second ambient light sensing operation) is performed within the third phase time of the phase time signal PHS5.

It is worth noting that, in the second one of the plurality of sensing cycles (that is next to the first one of the plurality of sensing cycles) of the sensing cycle signal SNS as shown in FIG. 5, the second light sensing operation, the first light sensing operation and the ambient light sensing operation are sequentially performed rather than the first light sensing operation, the second light sensing operation and the ambient light sensing operation are sequentially performed.

In detail, in the second one of the plurality of sensing cycles (that is next to the first one of the plurality of sensing cycles) of the sensing cycle signal SNS as shown in FIG. 5, the second light sensing operation is performed within the second phase time of the phase time signal PHS5, then the first light sensing operation is performed within the first phase time of the phase time signal PHS5, and then the ambient light sensing operation is performed within the third phase time of the phase time signal PHS5.

As described above, in the previous one (i.e., the first one) of the plurality of sensing cycles of the light sensing method of the first to fifth embodiments, the first light sensing operation, the second light sensing operation and the ambient light sensing operation are sequentially performed, but the present disclosure is not limited thereto. In practice, in the previous one of the plurality of sensing cycles, the first light sensing operation, the ambient light sensing operation and the second light sensing operation may be sequentially performed. Alternatively, in the previous one of the plurality of sensing cycles, the second light sensing operation, the first light sensing operation and the ambient light sensing operation may be sequentially performed. Alternatively, in the previous one of the plurality of sensing cycles, the second light sensing operation, the ambient light sensing operation and the first light sensing operation may be sequentially performed. Alternatively, the ambient light sensing operation, the first light sensing operation and the second light sensing operation may be sequentially performed. Alternatively, in the previous one of the plurality of sensing cycles, the ambient light sensing operation, the second light sensing operation and the first light sensing operation may be sequentially performed.

It is worth noting that, in the light sensing method of the present disclosure, the order of performing the first light sensing operation, the second light sensing operation and the ambient light sensing operation in the next one of the plurality of sensing cycles is different from that in the previous one of the plurality of sensing cycles.

In the light sensing method of the present disclosure, the counter circuit CT of the light sensing circuit as shown in FIG. 10 may perform an arithmetic operation on the first coarse count value and the first fine coarse count value that are counted within the first phase time to calculate a first count value of the first phase time.

In the light sensing method of the present disclosure, the counter circuit CT may perform an arithmetic operation on the second coarse count value and the second fine coarse count value that are counted within the second phase time to calculate a second count value of the second phase time.

In the light sensing method of the present disclosure, the counter circuit CT may perform an arithmetic operation on the third coarse count value and the third fine coarse count value that are counted within the third phase time to calculate a third count value of the third phase time.

In the light sensing method of the present disclosure, the counter circuit CT may perform an arithmetic operation on the fourth coarse count value and the fourth fine coarse count value that are counted within the second sub-phase time of the third phase time to calculate a fourth count value of the third phase time.

The counter circuit CT may subtract the third count value of the ambient light source from the first count value of the first light signal that is emitted by both of the ambient light source and the light-emitting diode TX and then is reflected by the tested object, to calculate a first light sensed count value of the light signal that is emitted by only the light-emitting diode TX and then is reflected by the tested object.

The counter circuit CT may subtract the fourth count value of the ambient light source from the second count value of the second light signal that is emitted by both of the ambient light source and the light-emitting diode TX and then is reflected by the tested object, to calculate a second light sensed count value of the light signal that is emitted by only the light-emitting diode TX and then is reflected by the tested object.

Finally, in the light sensing method of the present disclosure, the counter circuit CT or other circuits may, according to (an average value of) the first light sensed count value and the second light sensed count value, calculate light intensity of the light signal that is emitted by only the light-emitting component and then is reflected to the light sensing circuit by the tested object (such as the user of the electronic device). The counter circuit CT or other circuits may calculate the distance between the tested object and the electronic device, according to the light intensity of the light signal.

In conclusion, the present disclosure provides the light sensing method having the sensing order adjusting mechanism. In the light sensing method of the present disclosure, the light signals are sensed in different orders respectively in different ones of the plurality of sensing cycles. As a result, even if the ambient light source and the tested object dynamically change over time, the light sensing method of the present disclosure can still accurately sense the relevant values.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A light sensing method having a sensing order adjusting mechanism, comprising the following processes:
    performing a first light sensing operation to sense a first reflected light signal within a first phase time included in each of a plurality of sensing cycles, wherein [the] a first light signal is reflected by a tested object to form the first reflected light signal;
    counting a first coarse count value according to the first reflected light signal within the first phase time of each of the plurality of sensing cycles;
    performing a fine counting operation on the first coarse count value to output a first fine count value within the first phase time of each of the plurality of sensing cycles;
    performing a second light sensing operation to sense a second reflected light signal within a second phase time included in each of the plurality of sensing cycles, wherein a second light signal is reflected by the tested object to form the second reflected light signal;
    counting a second coarse count value according to the second reflected light signal within the second phase time of each of the plurality of sensing cycles;
    performing the fine counting operation on the second coarse count value to output a second fine count value within the second phase time of each of the plurality of sensing cycles;
    turning off the light-emitting component during a third phase time included in each of the plurality of sensing cycles;
    performing an ambient light sensing operation to sense a first ambient light signal within the third phase time of each of the plurality of sensing cycles;
    counting a third coarse count value according to the first ambient light signal within the third phase time of each of the plurality of sensing cycles;
    performing the fine counting operation on the third coarse count value to output a third fine count value within the third phase time of each of the plurality of sensing cycles; and
    sequentially performing the plurality of sensing cycles, wherein an order of performing the first light sensing operation, the second light sensing operation and the ambient light sensing operation in a next one of the plurality of sensing cycles is different from that in a previous one of the plurality of sensing cycles.

2. The light sensing method according to claim 1, further comprising the following process:
    sensing the first reflected light signal and the second reflected light signal respectively at different positions.

3. The light sensing method according to claim 1, further comprising the following process:
    in any one of the plurality of sensing cycles, sequentially performing the first light sensing operation, the second light sensing operation and the ambient light sensing operation.

4. The light sensing method according to claim 3, further comprising the following process:
    in the previous one or the next one of the plurality of sensing cycles, sequentially performing the first light sensing operation, the ambient light sensing operation and the second light sensing operation.

5. The light sensing method according to claim 3, further comprising the following process:
    in the previous one or the next one of the plurality of sensing cycles, sequentially performing the second light sensing operation, the first light sensing operation and the ambient light sensing operation.

6. The light sensing method according to claim 3, further comprising the following process:
    in the previous one or the next one of the plurality of sensing cycles, sequentially performing the second light sensing operation, the ambient light sensing operation and the first light sensing operation.

7. The light sensing method according to claim 3, further comprising the following process:
   in the previous one or the next one of the plurality of sensing cycles, sequentially performing the ambient light sensing operation, the first light sensing operation and the second light sensing operation.

8. The light sensing method according to claim 3, further comprising the following process:
   in the previous one or the next one of the plurality of sensing cycles, sequentially performing the ambient light sensing operation, the second light sensing operation and the first light sensing operation.

9. The light sensing method according to claim 1, further comprising the following processes:
   performing a first ambient light sensing operation to sense the first ambient light signal within a first sub-phase time included in the third phase time of each of the plurality of sensing cycles;
   performing a second ambient light sensing operation to sense a second ambient light signal within a second sub-phase time included in the third phase time; and
   counting a fourth coarse count value according to the second ambient light signal within the second sub-phase time of the third phase time of each of the plurality of sensing cycles; and
   performing the fine counting operation on the fourth coarse count value to output a fourth fine count value within the second sub-phase time of the third phase time of each of the plurality of sensing cycles.

10. The light sensing method according to claim 9, further comprising the following process:
    in each of the plurality of sensing cycles, performing the first light sensing operation, the second light sensing operation, the first ambient light sensing operation and the second ambient light sensing operation once;
    wherein an order of performing the first light sensing operation, the second light sensing operation, the first ambient light sensing operation and the second ambient light sensing operation in the next one of the plurality of sensing cycles is different from that in the previous one of the plurality of sensing cycles.

* * * * *